March 1, 1966 H. SCHOTTLER 3,237,468
VARIABLE SPEED DRIVE TRANSMISSION
Filed May 13, 1960 6 Sheets-Sheet 2

Inventor.
Henry Schottler.
By Byron, Hume, Groen, & Clement.
Attys.

March 1, 1966 H. SCHOTTLER 3,237,468
VARIABLE SPEED DRIVE TRANSMISSION
Filed May 13, 1960 6 Sheets-Sheet 3

Inventor.
Henry Schottler.
By Byron, Hume, Groen, & Clement
Attys.

March 1, 1966 H. SCHOTTLER 3,237,468
VARIABLE SPEED DRIVE TRANSMISSION
Filed May 13, 1960 6 Sheets-Sheet 5

Inventor,
Henry Schottler.
By Byron, Hume, Groen, & Clement.

United States Patent Office 3,237,468
Patented Mar. 1, 1966

3,237,468
VARIABLE SPEED DRIVE TRANSMISSION
Henry Schottler, North Riverside, Ill., assignor, by mesne assignments, to Roller Gear Ltd., Zug, Zug, Switzerland, a corporation of Switzerland
Filed May 13, 1960, Ser. No. 29,035
22 Claims. (Cl. 74—198)

This invention relates to mechanical type infinitely variable speed drive transmissions. More particularly, the invention relates to an infinitely variable speed drive transmission utilizing drive mechanism incorporating variable position drive balls frictionally engaging between inner and outer races.

The invention disclosed herein covers improvements in mechanical infinitely variable speed transmissions of the same general type as those disclosed and claimed in my co-pending patent application, Serial No. 852,902, filed November 13, 1959, entitled "Variable Speed Drive Transmission," which is a continuation of my prior co-pending patent application, Serial No. 536,231, filed September 23, 1955, now abandoned.

It is a general object of the present invention to provide an improved mechanical type infinitely variable speed drive transmission.

Another object of the invention is to provide an improved ball and race type power transmission capable of transmitting high torque loads between a drive and driven shaft through a wide range of infinitely variable speed ratios.

A further object of the invention is to provide a ball and race type transmission incorporating improved torque responsive mechanism for automatically controlling drive pressures.

Still another object of the invention is to provide an improved ball and race type transmission employing the lowest possible pressure between the torque transmitting members throughout the design range of speed ratios and torques.

A still further object of the invention is to provide an improved infinitely variable speed drive mechanical transmission eliminating thrust loads in shaft bearings.

An additional object of the invention is to provide a ball and race type transmission employing improved symmetrically acting torque responsive means applying the necessary engagement pressures for non-slip drive between the torque transmitting members under all conditions.

Another object of the invention is to provide an improved ball and race type transmission in which the contact paths of the power transmitting members are different at different speed ratios to increase the useful life of the power transmitting members.

Still another object of the invention is to provide an improved ball and race type transmission in which pairs of split inner and outer races are adjusted symmetrically with respect to the drive balls to change the speed ratio.

A further object of the invention is to provide an improved variable speed drive transmission having minimum inertia moments of torque transmitting members to increase the rapidity of speed ratio change.

Yet another object of the invention is to provide an improved control system for a mechanical infinitely variable speed drive transmission.

A still further object of the invention is to provide an improved ball and race transmission employing improved follow-up type control means for controlling the speed ratios.

An important object of the invention is to provide an improved ball and race type infinitely variable ratio transmission which can be economically manufactured and easily serviced.

Other objects, features and advantages will be apparent from the following detailed description, taken in conjunction with the accompanying drawings, in which.

Figure 1:
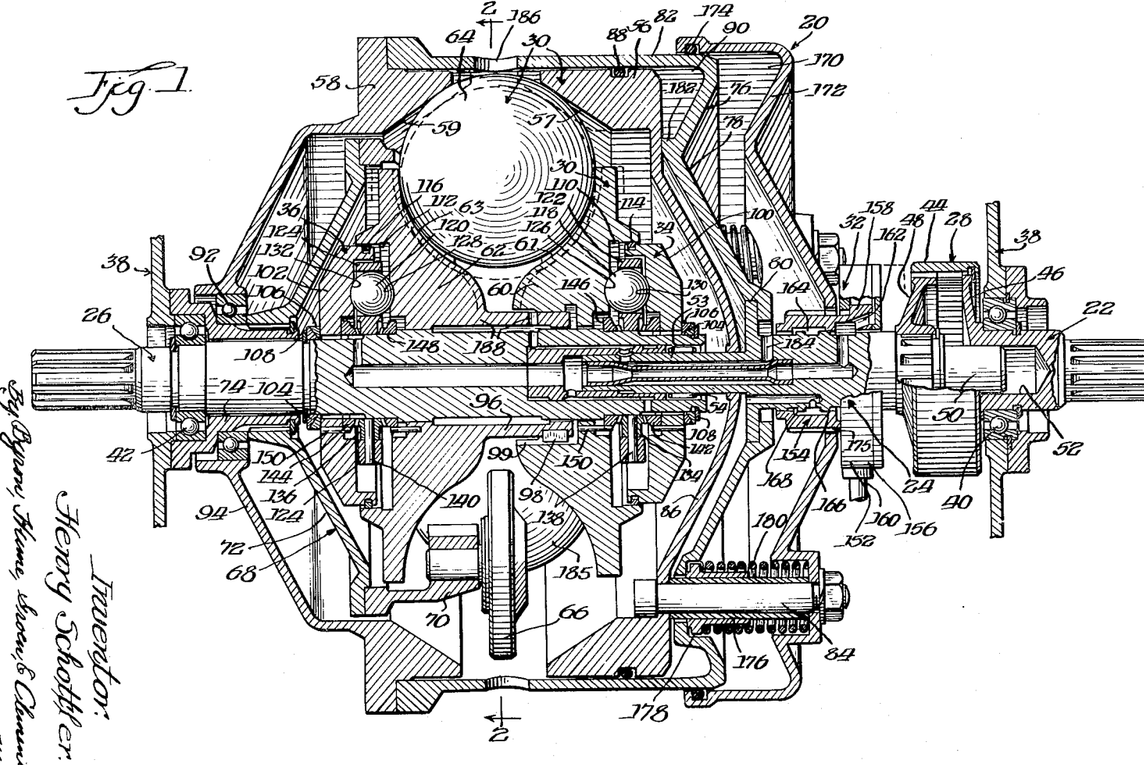
FIGURE 1 is a longitudinal sectional view of a mechanical infinitely variable speed drive transmission according to the present invention.
Figure 2:
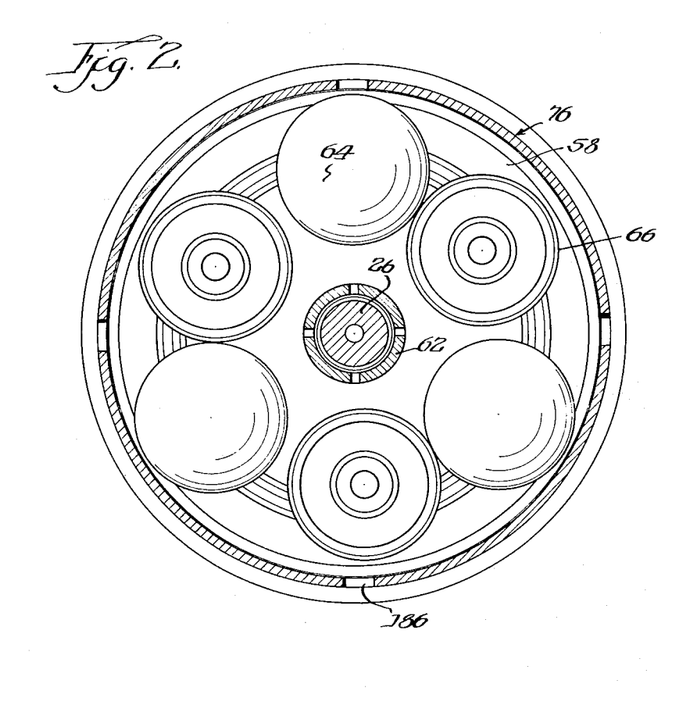
FIGURE 2 is sectional view taken along line 2—2 of FIGURE 1.

*General arrangement of FIGURE 1 transmission*

The transmission illustrated in FIGURE 1 is generally designated by the reference numeral 20. The transmission includes generally an input or drive shaft 22, an intermediate drive shaft 24 and an output or driven shaft 26, all of which are generally coaxial. A coupling 28 couples the drive shafts 22 and 24 for direct drive therebetween. The intermediate drive shaft 24 is operatively connected to the driven shaft 26 through infinitely variable speed drive mechanism, generally designated by the reference numeral 30, for providing a predetermined range of drive ratios. For example, in the specific embodiment illustrated in FIGURE 1 the range may extend between zero and approximately 2.3; in other words, for any given input shaft speed the output shaft speed may vary from zero to a value 2.3 times the speed of the input shaft. Speed ratios through the drive mechanism 30 are controlled by a hydraulic control system generally designated by the reference numeral 32. Torque responsive drive pressure devices 34 and 36 are provided for achieving minimum permissible drive pressures in the drive mechanism 30 responsive to changes in output shaft torque.

The transmission 20 includes a suitable stationary housing or casing 38 (only portions of which are shown) which encloses the various transmission portions and acts as an oil sump or reservoir. The drive shaft 22 is rotatably supported by an anti-friction bearing 40 which has its outer race anchored in an opening at one end of the transmission housing 38. A splined end of the drive shaft extends out of the housing for connection with a prime mover such as an internal combustion engine (not shown). The driven shaft 26 is rotatably supported by an anti-friction bearing 42 which has its outer race anchored in an opening at the other end of the transmission housing 38. A splined end of the driven shaft extends out of the housing for connection in any suitable manner to the driving wheels of a vehicle such as a tractor, a truck or an automobile, for example (not shown).

The coupling 28 connecting the drive shaft 22 with the intermediate drive shaft 24 includes an internally splined ring 44. The drive shaft 22 is formed with an externally splined integral web 46 which engages the internal splines in the ring 44 and is restrained from axial shifting therein by any suitable means. The right end portion of the intermediate shaft 24, as illustrated in FIGURE 1, is nonrotatably but axially shiftably secured to the coupler ring 44 through a coupler disc 48 which has an internally splined hub secured about mating splines on the intermediate shaft and external splines axially shiftably coupled with the internal splines in the coupler ring 44. In order to support the right end of the intermediate shaft 24 through the bearing 40, the shaft includes an integral journal member 50 which is slidably journalled in a mating bore 52 formed in the drive shaft 22.

The intermediate shaft 24 has an integral reduced diameter journal portion 53 at its left end which is rotatably and slidably piloted in an open bore in the driven shaft 26 by means of an anti-friction needle bearing 54.

*The variable speed drive mechanism 30*

The variable speed drive mechanism 30 includes a pair of outer or drive races 56 and 58 and a pair of inner or driven races 60 and 62 with a plurality of drive transmission balls 64 rotatably disposed between the races. The races 56, 58, 60 and 62 are provided with respective annular raceways or drive engagement surfaces 57, 59, 61 and 63 which frictionally engage the drive balls 64 at all times. The drive balls 64 are conveniently three in number and are retained in circumferentially spaced relation in the annulus formed by the raceways by means of three anti-friction reaction rollers 66. The rollers 66 are carried in circumferentially spaced relation with their axes parallel to the transmission axis by means of a stationary carrier 68. The carrier 68 includes a spider member 70 which carries the rollers 66 and which is fixedly secured to a disc member 72 which, in turn, is fixedly splined to a stationary sleeve 74. The sleeve 74 is anchored in any suitable manner to the stationary transmission casing 38.

The two outer races 56 and 58 are carried by a bell member 76. The bell member includes a web portion 78 which is fixedly secured to an integral flange 80 of the intermediate shaft 24. An integral outer cylindrical portion 82 of the bell member 76 is fixedly secured in any suitable manner to the left hand outer race 58. The right hand outer race 56 is axially shiftably disposed within the bell member 76 but is non-rotatably carried by the bell member by means of three circumferentially spaced bolts 84. An integral web 86 of the outer race 56 is slidably but closely fitted about the left end extension 53 of the intermediate shaft 24 to provide an hydraulic seal. The external periphery of the outer race 56 is hydraulically sealed within the cylindrical portion 82 by means of an O-ring 88 or the like. Thus, an outer race pressure chamber 90 is provided between the bell member 76 and the outer race 56 so that the outer race and its integral web act as a piston within the bell member.

The outer race 58 and the left end portion of the bell member 76 are rotatably supported by means of an anti-friction bearing 92 which has its inner race fixedly secured on the stationary sleeve 74. An integral web 94 of the outer race 58 is slidably supported on the outer race of the bearing 92. Accordingly, it will be seen that the intermediate drive shaft 24, the bell member 76 and the outer race 58 are all coupled together and are axially shiftably and rotatably supported in the housing 38. The loads imposed by these members are advantageously carried by the two widely separated anti-friction bearings 40 and 92. Furthermore, the support provided by the large diameter bell member 76 and the outer race 58 impart great stability to the outer race and to the intermediate shaft 24, and also to the output shaft 26 which is piloted on the intermediate shaft through the needle bearing 54.

The inner race 62 is axially slidably and rotatably supported on the driven shaft 26 in closely fitted relation and includes an integral sleeve portion 96 which stabilizes the race on the shaft. This prevents any tilting of the race and insures that the raceway 63 is always maintained concentric with respect to the driven shaft.

It will be seen that the construction and arrangement is such that the outer race 58 and the inner race 62 provide extremely firm support for the drive balls 64 and, accordingly, for the other outer race 56 and the other inner race 60. This is highly desirable because the loads carried through the drive mechanism 30 are quite high at times. By reason of the great stability of the outer race 58 and the inner race 62 the drive balls 64 may be very accurately positioned radially with respect to the concentric shafts. This great stability is important in providing accuracy of control and in preventing vibration and undue wear.

The various portions of the variable speed drive mechanism 30 are formed of materials, such as high grade steel, sufficiently hard and tough to carry the loads imposed under all conditions of operation.

*The torque responsive drive pressure devices 34 and 36*

The two inner races 60 and 62 are coupled to the drive shaft 26 through the respective torque responsive drive pressure devices 34 and 36 in a manner such that increasing torque resistance encountered by the drive shaft results in increasing contact pressure applied to the drive balls 64 through the inner races 60 and 62.

To this end, the inner race 62 is axially slidably and rotatably supported on the driven shaft 26 in closely fitted relation and includes an integral sleeve portion 96 which stabilizes the race 62 on the shaft. The inner race 60 is also axially slidably and rotatably disposed on the drive shaft 26 and is axially slidably but non-rotatably secured to the sleeve portion 96 of the other inner race 62 through a key 98 secured to the sleeve portion and an axial keyway 99 formed in the inner race 60. A torque disc 100 is splined on the right end portion of the driven shaft 26 and forms a portion of the torque responsive means 34, while a torque disc 102 is splined on a central portion of the driven shaft and forms part of the torque responsive means 36.

The two torque discs 100 and 102 are prevented from shifting axially away from each other by means of respective pairs of spherical washers 104 and 106 and a pair of snap rings 108. The snap rings are disposed in annular grooves formed around the driven shaft axially outwardly of the pairs of washers 104 and 106 to prevent the spherical washers from axial displacement. Each of the spherical washers 104 engages the respective snap rings while the spherical washers 106 engage the torque discs 100 and 102. The washers 104 have convex spherical surfaces which are engaged by complementary concave spherical surfaces of the washers 106. Thus, a very limited amount of universal pivoting of the torque discs is permitted with respect to the driven shaft to accommodate possible dimensional deviations in the variable speed drive mechanism 30 and in the torque responsive means 34 and 36.

Respective torque pressure chambers 110 and 112 are formed between the inner race 60 and the torque disc 100 of the torque device 34 and between the inner race 62 and the torque disc 102 of the torque device 36.

Leakage from these pressure chambers is prevented by means of respective piston sealing rings 114 and 116.

Figure 3:
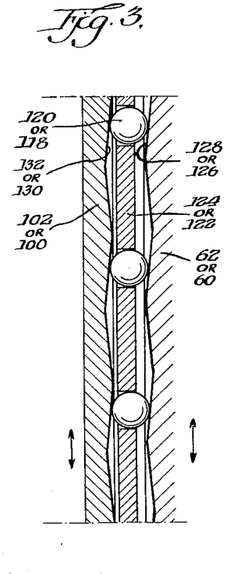
FIGURE 3 is a linear development of a portion of the torque responsive engagement pressure devices of the transmission shown in FIGURE 1.

The operative connection between the inner races 60 and 62 and the respective torque discs 100 and 102 is provided through respective sets of torque balls 118 and 120 which are held in circumferentially spaced relation by means of respective retainers 122 and 124. The torque balls are conveniently three in number in each set. They are disposed between respective recessed wedges or ramps 126 and 128 formed in the inner races 60 and 62 and opposed recessed wedges or ramps 130 and 132 formed in the opposed faces of the respective torque discs 100 and 102 (FIGURE 3).

Each of the retainers 122 and 124 carries a set of three pinion gears 134 and 136 respectively. The respective pinion gears are rotatably disposed on pins 138 and 140 which are secured to the respective retainers in positions spaced circumferentially between the torque balls 118 and 120. A pair of bevel gears 142 and 144 are fixedly secured in any suitable manner to the respective torque discs 100 and 102, while an opposed pair of bevel gears 146 and 148 are rotatably disposed on the driven shaft 26 but held in axially fixed relation thereon by respective shoulders formed on the shaft. The bevel gears 146 and 148 are axially shiftably but non-rotatably connected to the respective inner races 60 and 62 by suitable means such as pins 150. The bevel gears 142 and 146 are meshed with the pinion gears 134 on opposite sides thereof, and the bevel gears 144 and 148 are similarly meshed with the pinion gears 136.

The torque loading ramps 126 and 128 of the respective inner races 60 and 62 are mirror images of one another as are the torque loading ramps 130 and 132 of the respective torque discs 100 and 102. The ramps 126 are complementary to the ramps 130, and the ramps 128 are complementary to the ramps 132, as seen in FIGURE 3. FIGURE 3 is a linearly developed view of the ramp arrangement of the torque loading device 36, looking from the side of the transmission shown in FIGURE 1; it follows that FIGURE 3 is also a linearly developed view of the torque loading device 34 when viewed from the other side of the transmission.

The various parts of the torque responsive drive pressure devices 34 and 36 are formed of materials, such as high grade steel, having sufficient hardness and toughness to carry the loads imposed under all operating conditions.

*The hydraulic control system 32*

The hydraulic control system 32 includes generally a pump member 152, a control valve 154 and various hydraulic passages.

The pump 152 may be of any suitable type for supplying a flow of hydraulic fluid under pressure. An outer casing portion 156 of the pump is shiftably but non-rotatably connected to the transmission casing in any suitable manner, for example, through a manual control lever or a governor actuated shift fork (not shown). An internal pump member 158 is connected for rotating with the intermediate shaft 24. The pump is constructed so that relative rotation between the pump parts 156 and 158 causes hydraulic fluid to be pumped from a hydraulic reservoir (not shown) through an inlet 160 to supply hydraulic fluid under pressure to an outlet 162. The pump is provided with a maximum pressure relief valve (not shown) to limit the pump outlet pressure to a desired maximum by diverting hydraulic fluid back to the reservoir when this maximum pressure is reached.

The control valve 154 may be conveniently made integral with the pump member 158 so that axial shifting of the outer pump member 156 causes axial movement of the control valve. The valve 154 is provided with an annular control chamber 164 which cooperates with a pair of annular lands on the intermediate shaft 24 to provide a pair of annular control ports 166 and 168. The control chamber 164 is connected to the outer race pressure chamber 90. The control port 166 controls flow between the pump outlet 162 and the control chamber 164.

Figure 4:
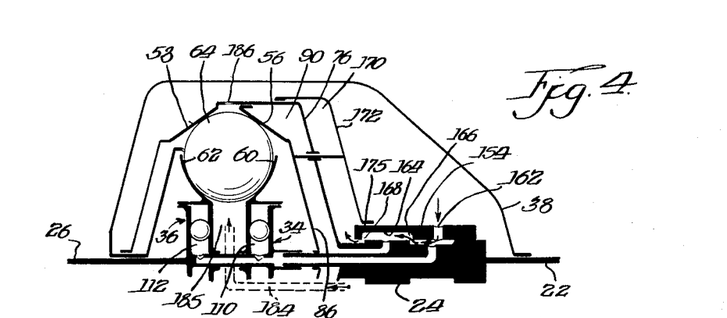
FIGURE 4 is a diagrammatic illustration of the transmission of FIGURE 1 showing the hydraulic speed control system with the control valve in a balanced position for operation of the transmission at a given speed ratio.
Figure 5:
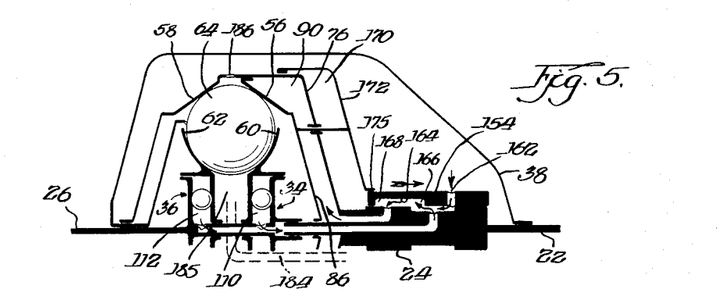
FIGURE 5 is a diagrammatic illustration similar to FIGURE 4 showing the control valve moved in the direction for increasing the speed ratio of the transmission.
Figure 6:
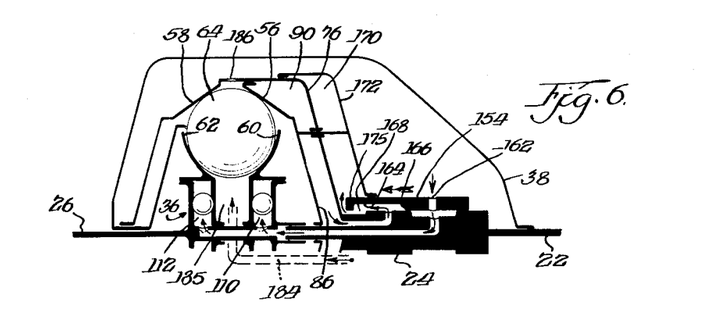
FIGURE 6 is a diagrammatic illustration similar to FIGURE 4 showing the control valve moved in a direction for decreasing the speed ratio of the transmission.

Referring to FIGURES 4–6, it will be seen that the pump outlet 162 is in constant communication with the torque loading pressure chambers 110 and 112 through suitable passages. Thus, hydraulic pressure is imposed in these chambers tending to urge the inner races 60 and 62 with equal force toward each other.

In order to provide a centrifugally induced hydraulic balance to oppose centrifugal pressure produced in the outer race chamber 90, a hydraulic balance chamber 170 is formed between the end of the bell member 76 and a cup member 172. The outer periphery of the chamber 170 is sealed by an O-ring 174 or the like. The hub of the cup member 172 is slidably splined about the outer surface of the valve member 154. Sufficient clearance is provided in this spline connection to form an exit port 175 from the chamber 170 to the transmission casing to prevent any appreciable pump-induced pressure build-up in the chamber 170.

The cup member 172 is non-rotatably but axially shiftably secured to the bell member 76, and hence to the intermediate shaft 24, through the attachment bolts 84. Spacer sleeves 176 are disposed around the bolts 84 and serve to provide a fixed spacing between the outer race 56 and the cup 172. The bell member 76 is provided with three apertures slidably receiving the spacer sleeves 176. Spring seat members 178 are slidably disposed over the spacer sleeves 176 and compression springs 180 are disposed between the cup member 172 and the spring seats to resiliently urge the spring seats against the bell member 76. The spring seat members are fitted to prevent hydraulic leakage between the pressure chamber 90 and the balance chamber 170. The springs 180 normally separate the bell member 76 and the cup member 172 to urge stops 182 of the bell member against the outer race 56, as seen in FIGURE 1.

The hydraulic balance chamber 170 is always connected, by means of suitable conduits 184, to the chamber 185 containing the drive balls 64. The drive ball chamber 185 is, in turn, vented through vents 186 to the pressure in the transmission casing 38. The conduit 184 enters the drive ball chamber 185 through a pair of ports 188 so spaced that hydraulic fluid is dumped into the drive ball chamber adjacent the raceway surfaces 61 and 63 of the inner races 60 and 62, so that these surfaces are always provided with hydraulic fluid for cooling and lubrication.

*Operation of embodiment of FIGURES 1–6*

The variable speed drive mechanism 30 operates in somewhat the same manner as the variable speed drive mechanism of my prior invention, covered in co-pending Serial No. 852,902 referred to earlier. In accordance with the concepts of that earlier invention, the raceways 57 and 59 of the outer races 56 and 58 have a curvature formed by a generatrix the radius of which is considerably greater than the radius of the generatrix forming the curvature of the inner raceways 61 and 63 of the races 60 and 62. As described in the earlier application, the radii of the generating curves of the raceways and the radius of the drive balls 64 should satisfy the relation $$r_0 - r \geq 2(r_1 - r)$$

where "$r$" is the radius of the drive balls 64, "$r_0$" is the radius of the generatrix of the curvature of the raceways 57 and 59 of the outer races 56 and 58 and "$r_1$" is the radius of the generatrix of the curvature of the raceways 61 and 63 of the inner races 60 and 62. The outer raceways may assume the form of opposed internal cones, as shown in FIGURE 1, in which case "$r_0$" is infinite.

In general, rotation of the drive shaft 22 causes rotation of the intermediate shaft 24, which, in turn, rotates the outer races 56 and 58 at the same speed. This causes the drive balls 64 to rotate about axes parallel to the transmission axis. Inasmuch as the drive balls 64 are restrained from circumferential movement by the reaction rollers 66, rotation of the drive balls about their axes causes resultant rotation of the inner races 60 and 62 in a direction opposite to the direction of rotation of the outer races 56 and 58. The inner races 60 and 62 are coupled to the output shaft 26 through the torque devices 34 and 36, so that the output shaft is driven at the same speed and in the same direction as the inner races.

The drive ratio between the input and output shafts depends upon the relationship of the perpendicular distances from the axes of the drive balls to the respective points of contact of the outer races and the inner races with the drive balls and also depends upon the relative distance from the points of contact of the inner races to the transmission axis. If the inner races contact the drive balls at the spin axes, then the speed ratio will be zero, so that the driven shaft will not rotate regardless of the speed rotation of the drive shaft. If the outer races are pressed toward one another, the drive balls are moved radially inwardly pressing the inner races apart and moving the points of contact with the inner races radially inwardly from the spin axes of the drive balls. This causes an increase in the speed ratio because the distance from the outer race points of contact to the drive ball axes remains the same while the distance from the drive ball axes to the inner race points of contact increases, and at the same time the distance to the transmission axis is decreased. The driven shaft 26 rotates faster and faster with respect to any given speed of rotation of the drive shaft as the drive balls are pressed farther radially inwardly.

The relationship of the race curvatures and the drive ball diameter and locations of this embodiment are such that the speed ratio varies from zero when the drive balls are in their radially outward-most positions as shown in FIGURE 1 to a speed ratio of 2.3 to 1 when the drive balls are forced to their radially inward-most positions as indicated in dotted lines in FIGURE 1.

When it is desired to increase the speed ratio from that shown in FIGURE 1, the pump casing 156 is moved to the right, as seen in FIGURE 5, causing the control port 166 to be opened wider and the control port 168 to be closed. This imposes maximum pump pressure in the outer race chamber 90 causing the bell member 76 to be separated from the outer race web 86 which draws the two outer races 56 and 58 toward one another. As a result, the drive balls are forced radially downwardly causing the inner races 60 and 62 to be separated. This change continues until the bell member 76 has moved the intermediate shaft 24 sufficiently toward the right to again balance the control ports 166 and 168 as shown in FIGURE 4. When this position is reached, the control is again in equilibrium, and the outer races 56 and 58 assume a given distance apart depending upon the selected position of the control valve 154. This provides a given speed ratio which is maintained until the control valve is again moved.

If it is desired to reduce the speed ratio, the control valve 154 is moved toward the left as shown in FIGURE 6, causing momentary closing of the control port 166 and increased opening of the control port 168. Accordingly, the pressure in the outer race chamber 90 is directed to the balance chamber 170 where it is vented to the transmission casing through the vent clearance 175 and through the drive ball chamber 185. Reduction of the pressure in the outer race pressure chamber 90 permits the springs 180 to force the outer race web 86 and the bell member 76 toward each other causing separation of the outer races 56 and 58. At the same time, the pump pressure momentarily increases due to closing of the control port 166, resulting in increased pressure in the torque pressure chambers 110 and 112 which acts through the inner races 60 and 62 and the drive balls 64 to assist in separation of the outer races 56 and 58. Separation of the outer races causes the intermediate shaft 24 to be shifted toward the left until the control ports 166 and 168 are again balanced so that the pressure in the chamber 90 is just sufficient to maintain the outer races in a given position with respect to each other, as dictated by the selected position of the control valve 154. Thus, the newly selected speed ratio is maintained until the control valve is again moved.

It will be seen from the description so far that the control valve 154 is of the "follow-up" type in that the intermediate shaft follows the control valve movements.

During the control operation, the balance chamber 170 performs an important function in counter-balancing the effect of the centrifugal head in the pressure chamber 90. It will be noted that the balance chamber 170 is slightly larger in diameter than the pressure chamber 90 so that centrifugal pressure generated in the balance chamber will always be greater than centrifugal pressure generated in the pressure chamber regardless of the speed of rotation. The balance chamber 170 is always full of oil when the unit is rotated because the vent 175 and the conduit connecting it with the drive ball chamber are at its hub. Thus, there is always a positive resultant centrifugal head pressure force tending to separate the outer races 56 and 58.

The torque responsive devices 34 and 36 automatically maintain the contact pressures between the drive balls 64 and the inner and outer races to that value required to prevent slippage, whatever the torque may be. If the transmission is operating at a given speed ratio and the driven shaft encounters increased torque resistance, this torque resistance causes the driven shaft to lag slightly. The lagging of the driven shaft causes slight rotation of the torque discs 100 and 102 relative to the inner races 60 and 62. This results in relative movement between the ramps in the torque devices in a manner such that the torque disc ramps 130 and 132 urge the torque balls 118 and 120 toward the respective inner race ramps 126 and 128. Since the torque balls maintain a given perpendicular distance between the ramps, this causes the inner races to be pressed axially toward one another resulting in an increased contact pressure between the inner races and the drive balls and, due to the wedging action of the inner races, an increased contact pressure with the outer races. In most instances, the actual movement of the inner races is imperceptible but the increase in contact pressure may be quite large depending upon the increased torque resistance.

If, on the contrary, the torque resistance encountered by the driven shaft is decreased, the contact pressure with the drive balls is commensurately decreased.

When the torque load on the driven shaft is reversed, in other words, when the vehicle containing the transmission is coasting down a hill using the engine as a brake, the driven shaft will tend to overrun which will cause the torque discs 100 and 102 to be rotated relative to the inner races in the opposite direction, which in turn, will cause the torque balls 118 and 120 to move against the oppositely inclined portions of the respective ramps. As the overrunning torque increases, so the contact pressure between the drive balls and the races will also increase to prevent slippage during engine braking.

During operation of the torque responsive devices 34 and 36, the bevel gears 142 and 144 coact through the respective pinion gears 134 and 136 and the opposite bevel gears 146 and 148 to rotate the retainers 122 and 124 an amount equal to half the relative rotation between the torque discs 100 and 102 and the respective inner races 60 and 62. In other words, as the torque discs rotate relative to the inner races, the retainers are rotated in the same direction half the distance so that the torque balls 118 and 120 are always maintained in their proper spacing relative to the ramps. Accordingly, the bevel gears and pinion gears synchronize the circumferential movements of the torque balls with the relative rotational movements between the torque discs and the inner races.

During operation of the transmission, pressure in the outer race pressure chamber 90 is automatically regulated through the control system 32 to a value just sufficient to maintain the spacing between the outer races which is selected through the control valve 154. In other words, this pressure is maintained at a value which is sufficient to provide an outer race operating force equal to the sum of all of the opposing forces. These opposing forces are the force exerted by the springs 180, the separating force exerted through the torque loading devices 34 and 36, the resultant force due to the difference between the centrifugal head pressures in the chambers 90 and 170, and extraneous forces due to friction and the like. As the torque load on the driven shaft increases, the pressure in the outer race pressure chamber 90 must necessarily increase to maintain the outer races in their relative positions against the increased contact force exerted through the torque devices 34 and 36. Inasmuch as the spring force and the resultant centrifugal head pressure forces are relatively small and much more constant, the pressure in the outer race pressure chamber 90 is essentially directly proportional to the torque being transmitted through the transmission.

Under ordinary conditions of operation, the pressure in the torque device pressure chambers 110 and 112 is equal to the pressure in the outer race pressure chamber 90 plus the pressure drop through the control port 166. Therefore, the pressure in these chambers 110 and 112 is also essentially directly proportional to the torque being transmitted through the transmission. The torque responsive pressure in these pressure chambers exerts a torque variable force against the inner races 60 and 62 supplementing the mechanical force exerted through the torque balls 118 and 120. Therefore, the drive contact pressure exerted through the inner races is the result of addition of the mechanical torque responsive force and the hydraulic torque responsive force.

The various parts of the transmission are so dimensioned that the resultant drive contact pressure exerted through the torque responsive devices 34 and 36 is always just sufficient to prevent slippage at the torque being transmitted. When relatively small torques are being transmitted, the torque variable pressure in the torque chambers 110 and 112 is relatively low and the torque variable mechanical force exerted through the torque responsive devices is also relatively low. As the torque load being carried increases, the drive contact pressure increases an amount just sufficient to provide non-slip drive but no more. Accordingly, only at very high torque loads is a very high contact pressure applied. This results in increased efficiency of operation of the transmission and also greatly reduces wear.

It will be noted that both the mechanical and the hydraulic forces exerted by the torque loading devices 34 and 36 are equal and opposite. Furthermore, the positions of the respective retainers 122 and 124 and the respective torque balls 118 and 120 are exactly coordinated, so that the inner races 60 and 62 are always moved exactly the same distance in opposite directions. This means that the centers of the drive balls 64 are always maintained in a given plane relative to the driven shaft. In other words, the torque devices 34 and 36 are constructed and arranged so that the races move toward and away from each other symmetrically so that there is no axial movement of the drive balls 64. Accordingly, the outer races are also moved symmetrically so that there are axial inertia forces to detract from the control precision.

The torque devices 34 and 36 exert equal and opposite thrust forces which are exerted against the spherical washers 104 and 106 and the snap rings 108. Inasmuch as these washers and rings are carried by the driven shaft 26, the thrust forces are exerted as tension in the driven shaft, and no thrust bearings are required.

It will be noted that the transmission does not incorporate separate preload means for inducing initial contact pressure between the drive balls and the races since this is not necessary with the control system of this invention. As soon as the control valve sleeve 164 is moved toward the right from its zero speed ratio position, the outlet control port 168 is restricted and the inlet control port 166 is opened wider to increase the pressure in the outer race chamber 90, pressing the outer races together. This immediately causes an increase in pressure in the torque pressure chambers 110 and 112 to cause the inner races to oppose the movement of the outer races. Accordingly, the necessary drive contact pressure between the races and the drive balls is immediately provided. The system has the advantage of requiring no appreciable drive contact at zero speed ratio which is the "neutral" position in the transmission, thus reducing wear of the races and drive balls.

The amount of cooling and lubrication of the races and drive balls is advantageously proportional to the heat being generated. Since the oil film on the inner raceway surfaces 61 and 63 is motivated by centrifugal force, larger quantities of oil will cling to the surfaces at lower speeds when the contact diameter with the drive balls is greater. With larger contact diameter, more heat is generated between the inner races and the structure inherently provides more cooling effect as needed.

Figure 7:
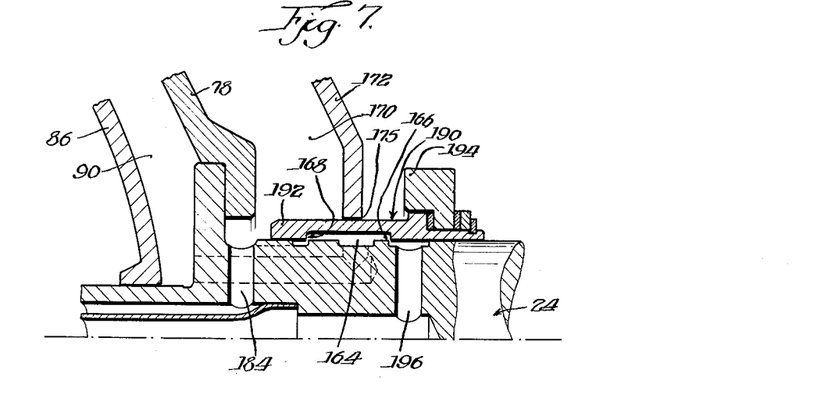
FIGURE 7 is an enlarged fragmentary sectional view of another embodiment of hydraulic speed control valve for use in a transmission like that of FIGURE 1.

*Control valve embodiment of FIGURE 7*

In place of the control valve 154 of FIGURE 1, the embodiment of FIGURE 7 utilizes a modified control valve 190. This valve is intended to be incorporated in a transmission which may be substantially the same as that of FIGURE 1. The valve 190 comprises a sleeve portion 192 which is quite similar to the sleeve portion of the control valve 154 except that the sleeve is not connected to or a part or a pump. Accordingly, it is not necessary to spline the cup member 172 to the valve sleeve 192, although there is still a clearance provided to form the pressure relief passage 175. In a manner similar to the control valve 154, the valve 190 includes the annular control chamber 164 between the pair of annular lands on the intermediate shaft 24 to form the annular control ports 166 and 168. The hydraulic conduits to the chambers 90 and 170 are the same as in the FIGURE 1 embodiment.

In this control embodiment, a torque responsive control ring 194 which is disposed in a fixed axial position on the valve sleeve. The control ring 194 is connected to means (not shown) for shifting the valve body 192 axially in order to change the speed ratio in transmission. For example, the control ring may be connected by a suitable shift fork or the like (not shown) to a manual or automatic remote control mechanism for speed ratio adjustment. A separate hydraulic pump (not shown) delivers hydraulic fluid under pressure to a passage 196 to supply hydraulic pressure to the control system in a manner similar to the FIGURE 1 embodiment.

The control valve of FIGURE 7 operates in the same manner as the control valve 154 of FIGURE 1, so that movement of the control valve toward the right causes an increase in the speed ratio and movement of the control valve toward the left causes a decrease.

Figure 8:
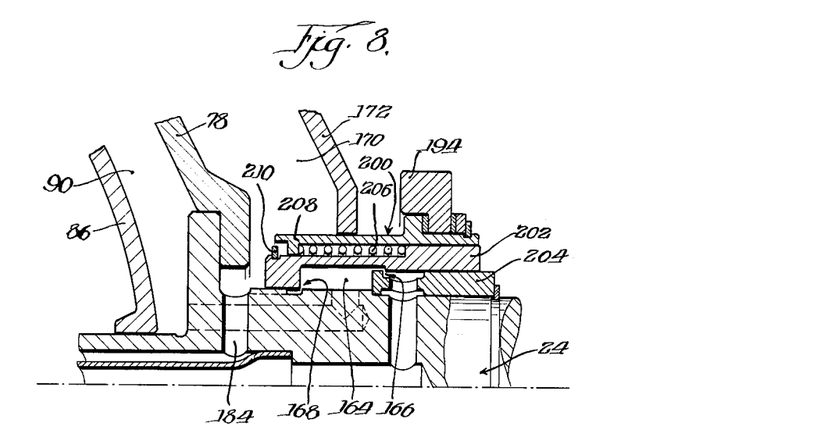
FIGURE 8 is an enlarged fragmentary sectional view of a third embodiment of hydraulic speed control valve for use in a transmission like that of FIGURE 1.

*Control valve embodiment of FIGURE 8*

In this control embodiment, a torque responsive control valve 200 replaces the control valves of the previous embodiments. In place of the valve sleeve 192 of FIGURE 7, a stepped valve sleeve 202 is utilized. A spacer sleeve 204 is axially fixedly disposed on the intermediate shaft 24 between the intermediate shaft and the right end portion of the valve sleeve 202. Through imposition of the spacer sleeve 204, the annular control port 166 is of larger diameter than the annular control port 168. The same hydraulic conduits to the chambers 90 and 170 are provided as in the previous embodiments. Accordingly, the pressure in the annular control chamber 164 between the control ports tends to move the valve body 202 toward the left which tends to decrease the speed ratio.

To counteract the pressure unbalance force biasing the valve sleeve 202 toward the left, a compression control spring 206 is disposed between the valve sleeve and an outer contral sleeve 208. The control spring 206 acts between opposed shoulders on the two sleeves in a manner such that the compressive force of the spring opposes the pressure unbalance force on the valve sleeve. A stop member, in the form of a snap ring 210, is secured about the left end portion of the valve sleeve and cooperates with an annular shoulder on the control sleeve 208 to provide a limit to the spring biased movement of the control sleeve toward the left with respect to the valve sleeve.

The same control ring 194 is utilized but in this embodiment it is rotatably and axially fixedly disposed about the right end portion of the control sleeve 208. Shifting of the control ring 194 to the right or left respectively increases or decreases the speed ratio by shifting the valve body 202 in a manner similar to the previous embodiments. However, inasmuch as the pressure in the control chamber 164 increases with increase in torque transmitted by the transmisison, the resultant pressure unbalance shifts the valve sleeve 202 toward the left against the bias of the control spring 206 to cause a decrease in the speed ratio with increase in torque. Thus, in this embodiment the speed ratio varies inversely with the torque being transmitted in order to provide increasing mechanical advantage to transmit increasing torque. This torque responsive shifting of the valve sleeve occurs regardless of the speed ratio selected. The amount of torque induced speed ratio reduction is dependent upon the pressure unbalance area and the spring rate of the control spring 206.

When the control embodiment of FIGURE 8 is utilized, an increase in the torque load imposed upon the driven shaft will cause the transmission to automatically reduce its speed ratio in order to more readily carry the increased torque. If the torque load is decreased, the speed ratio is commensurately increased to more efficiently utilize the engine power. It will be seen that the stop member 210 prevents the speed ratio from being increased beyond a given maximum for any given position of the control ring 194.

Figure 9:
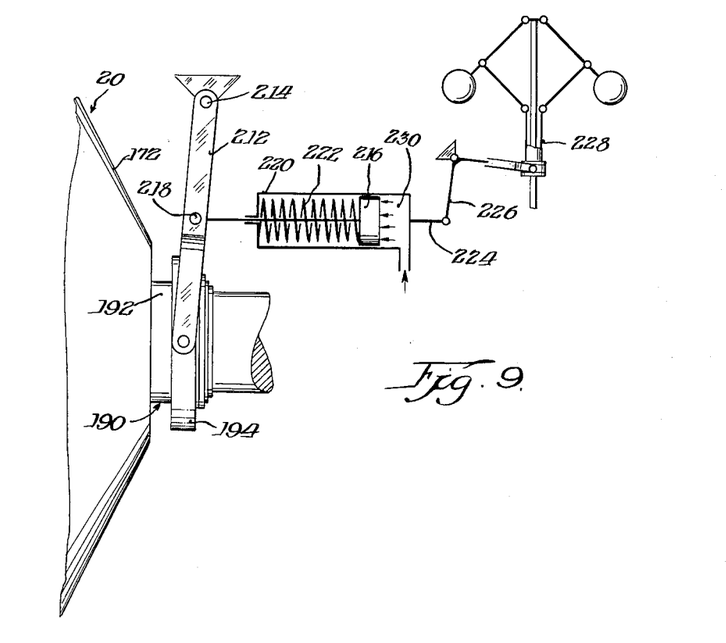
FIGURE 9 is a schematic illustration of an automatic speed ratio control system for use with the control valve of FIGURE 1 or FIGURE 7.
Figure 10:
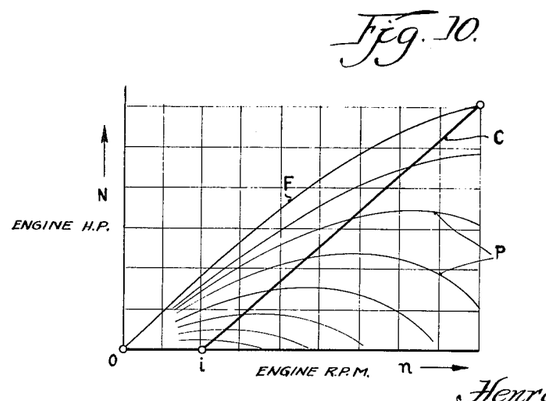
FIGURE 10 is a graphic illustration of engine horsepower plotted against engine speed for various engine throttle openings of a typical internal combustion engine, showing desirable governor characteristics for control of a transmission according to the present invention to achieve lowest engine fuel consumption with highest possible transmission speed ratios.

*Automatic control embodiment of FIGURES 9 and 10*

When the transmission of this invention is utilized in a vehicle, it is desirable to operate the engine according to an optimum governor characteristic representing the lowest fuel consumption while at the same time operating the transmission at the highest possible speed ratio in order to achieve maximum efficiency and durability. FIGURE 10 is a graphic illustration of the characteristics of a typical internal combustion engine plotting engine horsepower against engine r.p.m. In this illustration, the curve "F" is a plot of engine horsepower versus engine speed at full throttle while the various curves "P" illustrate the same engine characteristics at various partial throttle settings. The line "C" illustrates an approximate optimum relationship between engine horsepower and engine speed for achieving lowest engine fuel consumption from idle speed "*i*" up to maximum engine speed.

The transmission automatic control schematically illustrated in FIGURE 9 is arranged to control the transmission speed ratios in order for the vehicle engine to follow the optimum governor characteristic line "C" of FIGURE 10. This control is applied to a transmission 20 according to FIGURE 1 having a control valve arrangement 190 according to FIGURE 7. However, the control valve 154 of FIGURE 1 could be utilized if desired.

In the control system of FIGURE 9 a control fork 212 is pivotally pinned to a stationary portion of the transmission at 214 and has its forked end connected for axially shifting the control ring 194. A control piston 216 has its piston rod pivotally pinned to the fork 212 at a centrally located position 218, and the piston is disposed in a control cylinder 220. A compression control spring 222 is disposed about the piston rod between the piston and one end of the cylinder, thereby resiliently biasing the piston toward the right, tending to move the control ring toward the right for increasing the transmission speed ratios. At its other end, the cylinder 220 is connected to a link 224 which is pivotally secured to one arm of a bell crank lever 226. The bell crank lever is centrally pivoted to a stationary portion of the transmission, and its other arm is connected by conventional fork means to the operating sleeve of a centrifugal governor 228. The governor 228 is of any suitable design and is connected for being driven by the transmission output shaft 26 of the transmission, or by some other driven part of the vehicle. The governor causes the bell crank lever 226 to be pivoted in a counterclockwise direction with increasing vehicle speed and in a clockwise direction with decreasing vehicle speed. A cylinder chamber 230 at the opposite side of the piston 216 from the spring 222 communicates with a torque responsive pressure in the control system, for example, the pressure in the annular control chamber 164 or the corresponding torque responsive pressure in the outer race pressure chamber 90.

In operating a vehicle utilizing the automatic control system of FIGURE 9 any suitable means may be employed (not shown) for causing initial shifting of the outer races toward each other in order to shift the transmission from zero speed ratio to an initial low speed ratio so that the vehicle will begin to move. For this purpose, a conventional manual foot or hand control (not shown) may be utilized to shift the control ring 194 slightly to the right, or a simple manual valve (not shown) may be employed to supply initial pressure in the pressure chamber 90.

Once the vehicle has begun to move, it may be accelerated by increasing the engine speed, and all further control is affected through operation of the accelerator pedal only. As the vehicle speed increases, the governor 228 will pivot the bell crank lever 226 in a counterclockwise direction to shift the control cylinder 220 toward the right. This increases the compression force exerted by the spring 222 and causes the shifter fork 212 to pivot, moving the control ring 194 and the control valve toward the right to increase the transmission speed ratio. As the speed ratio increases, so the vehicle speed further increases. At the same time, however, the increase in speed ratio and the increase in engine speed result in an increased torque resistance which causes an increased pressure in the cylinder chamber 230. This torque responsive pressure increase opposes movement of the piston toward the right until a position of equilibrium is obtained between the spring bias, the pressure bias and the governor bias. This point of equilibrium is achieved when the bias of the spring 222 is adjusted by the governor 228 until it is exactly equal to the pressure bias on the piston. As long as the same conditions obtain, the engine speed and transmission speed ratio will remain the same so that the vehicle will travel with a given speed.

Suppose, for example, that control equilibrium has been established at a 40 m.p.h. vehicle speed with the engine operating at 1400 r.p.m., and 30 horsepower and with a transmission speed ratio of 1.9 to 1 while the vehicle is traveling on a level road. If the vehicle then begins to go uphill, it will slow down if the accelerator pedal is kept in the same position, inasmuch as the torque resistance increases. The reduction in vehicle speed will cause the control valve to move to the left reducing the speed ratio to 1.2 to 1, for example. Accelerator position and, accordingly, engine power and engine speed have remained constant so that the engine torque does not change.

However, the vehicle speed will be reduced to about 25 m.p.h. by reason of the reduction in speed ratio.

If the vehicle begins to move downhill while the accelerator pedal remains in a fixed position, the vehicle acceleration will cause the control valve to increase the transmission speed ratio. In order to use the engine as a brake, the accelerator pedal is released. By reason of the increasing vehicle speed and the decreasing engine torque, the transmission ratio will immediately increase to maximum. If, however, the engine speed is reduced to idling in the neighborhood of 600 r.p.m. or the like, the vehicle speed will be reduced from 40 m.p.h. to about 17 m.p.h. with the idling engine acting as a brake. For additional speed reduction the vehicle brakes must be employed.

Of course, the examples given are based on the particular combination of engine, vehicle and transmission. It will be understood that changes in these and in the dimensions of the control levers and forks and changes in the governor and spring characteristics will result in different operational characteristics.

While a mechanical governor is shown, it will be recognized that a hydraulic governor, or any other suitable type of governor, can be substituted to the same effect.

If desired, a manual speed ratio adjustment system similar to that described in connection with FIGURE 1 may be used in conjunction with the automatic control system of FIGURE 9. In that event, the manual system can be utilized to set an initial low speed ratio for start and may also be utilized for manually selected, forced reduction of speed ratio in order to more effectively utilize the engine as a brake. Such a manual system could be actuated through a conventional drive selector lever (not shown) for example, where a "neutral" setting will hold the transmission at zero speed ratio, a "drive" setting will initially shift the control valve to a very low ratio for start and will permit automatic change to maximum ratio, and a "low drive" setting will limit the top ratio to a desired value below maximum.

The vehicle speed control governor of FIGURE 9 can readily be applied to the control system of FIGURE 8 by connecting one arm of the bell crank lever 226 to the control ring 194 of the control valve 200. In this event, the control sleeve 208 is equivalent to the cylinder 220, the control spring 206 is equivalent to the spring 222 and the control valve 202 takes over the function of the piston 216 as well as the control valve. Accordingly, this modified control system of FIGURE 8 will operate in substantially the same manner as the automatic control system of FIGURE 9, thus providing combinations of vehicle speed, transmission torque ratio, engine r.p.m. and engine horsepower to satisfy the desired governor characteristic line "C" of FIGURE 10.

Figure 11:
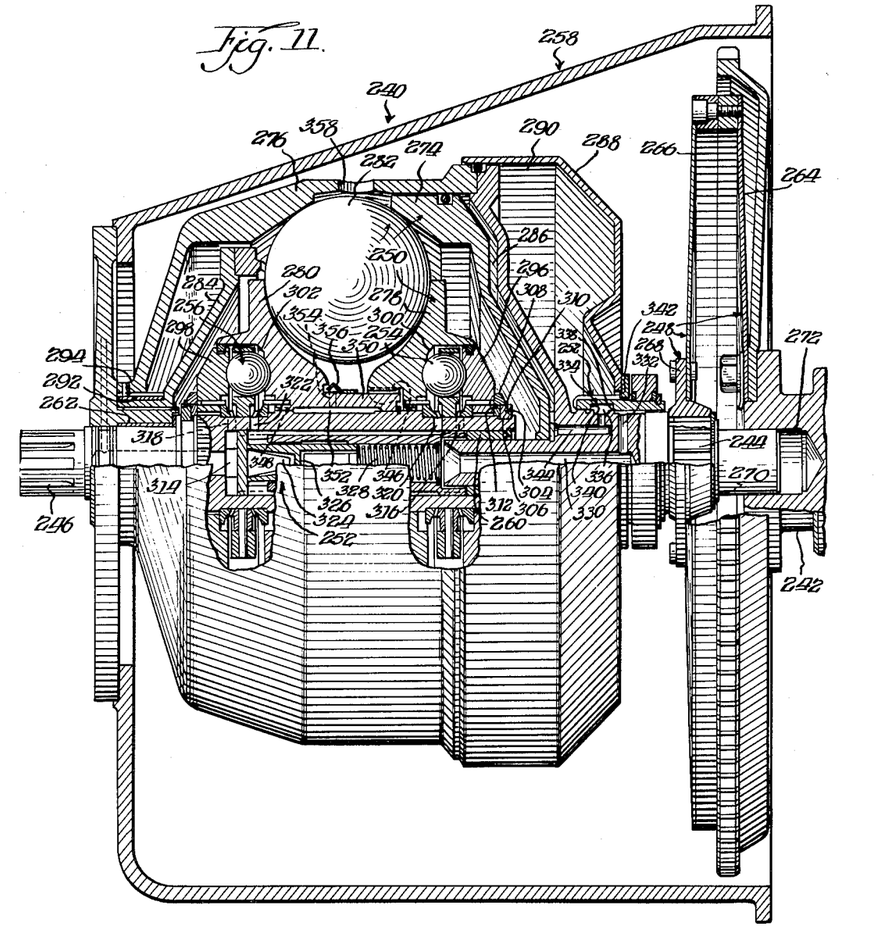
FIGURE 11 is a longitudinal sectional view of another embodiment of mechanical infinitely variable speed drive transmission according to this invention.

*Modified transmission embodiment of FIGURE 11*

The modified transmission of FIGURE 11 is generally designated by the reference numeral 240. In general, it is quite similar to the transmission 20 of FIGURE 1 and operates in substantially the same manner.

To this end, the modified transmission includes a drive or input shaft 242, an intermediate drive shaft 244 and a driven or output shaft 246, all of which are generally co-axial. A coupling 248 couples the drive shafts 242 and 244 for direct drive. The intermediate drive shaft 244 is operatively connected to the driven shaft 246 through infinitely variable speed drive mechanism generally designated by the reference numeral 250 for providing a pre-determined range of drive ratios, substantially the same as the drive ratio range of the FIGURE 1 embodiment. Speed ratios through the drive mechanism 250 are controlled by a hydraulic control system generally designated by the reference numeral 252. Torque responsive drive pressure devices 254 and 256 are provided for achieving minimum permissible non-slip drive pressures in the drive mechanism 250 responsive to changes in output shaft torque. The transmission is housed in a suitable stationary housing or casing 258.

In place of the anti-friction bearings of the embodiment of FIGURE 1, the modified transmission 240 incorporates plain sleeve bearings throughout. For example, the intermediate shaft 244 is slidably piloted and rotatably supported within the driven shaft 246 by means of a plain bearing 260 in place of the needle bearing 54 of the FIGURE 1 embodiment, and the driven shaft 246 is rotatably supported in the housing through a plain bearing 262 in place of the anti-friction bearing 42 of the FIGURE 1 embodiment.

The coupling 248 between the drive shaft 242 and the intermediate shaft 244 incorporates a flexible torque disc 264 fixedly secured to the drive shaft 242 and a flexible torque disc 266 fixedly secured to a splined hub member 268. The two torque discs are of substantial diameter and have their outer peripheries secured together in spaced relation as shown. The hub member 268 is provided with internal splines which are connected with mating external splines formed on the intermediate shaft 244. A pilot journal 270 of the intermediate shaft is slidably piloted in a cylindrical bore 272 on the drive shaft. The discs and their connections with one another and the shafts are sufficiently strong and rigid in torsion to transfer torque between the shafts under all conditions. However, the torque discs have substantial resilence in bending to permit the intermediate shaft 244 to shift axially with respect to the drive shaft 242 in the same manner that the intermediate shaft 24 is axially shiftably disposed with respect to the drive shaft 22 of the FIGURE 1 embodiment.

The variable speed drive mechanism 250 is essentially the same as the variable speed drive mechanism 30 of the FIGURE 1 embodiment. The drive mechanism 250 includes a pair of outer races 274 and 276 and a pair of inner races 278 and 280 with three drive balls 282 disposed therebetween in circumferentially spaced positions. Reaction rollers (not shown) are also provided and are substantially the same as the reaction rollers 66 of the FIGURE 1 embodiment. These rollers are carried by a stationary carrier member 284. The outer races are connected with parts forming an outer race pressure chamber 286 which corresponds with the outer race pressure chamber 90 of the FIGURE 1 embodiment. A cup member 288 is incorporated to form a hydraulic balance chamber 290 corresponding to the balance chamber 170 of the earlier embodiment.

The outer race 276 is rotatably and axially shiftably supported by means of a plain bearing 292. The inner periphery of the bearing is rotatably carried on a stationary hub portion of the carrier 284 while the outer periphery of the bearing is axially shiftably but non-rotatably secured in any suitable manner to a hub portion 294 of the outer race.

The various parts of the variable speed drive mechanism 250 coact in exactly the same manner as the corresponding parts of the drive mechanism 30 of the first embodiment to perform the same results.

The torque responsive drive pressure devices 254 and 256 correspond to the torque devices 34 and 36 of the FIGURE 1 embodiment. They include a pair of torque discs 296 and 298 axially shiftably splined on the driven shaft 246 and acting through respective ramps and torque balls to provide a torque responsive drive pressure on the drive balls 282 through the inner races 278 and 280. The torque balls are carried by carriers which are synchronized through gears in the same manner as in the first embodiment. Torque device pressure chambers 300 and 302 are provided between the respective torque discs and inner races to accommodate torque responsive hydraulic pressure acting in conjunction with the torque responsive mechanical pressure against the inner races.

In order to maintain the given axial spacing between the torque discs 296 and 298 a retainer ring combination 304 is secured about the driven shaft 262 and immediately axially outwardly of each of the two torque discs. Each of these retainer ring combinations includes a split ring 306, a solid ring 308 to hold the split ring in place and a snap ring 310 to prevent axial displacement of the solid ring. A sealing washer 312 is included in the combination to prevent leakage from the torque pressure chambers.

The torque devices 254 and 256 operate in the same manner as the torque devices 34 and 36 of the FIGURE 1 embodiment.

The hydraulic control system 252 of the FIGURE 11 embodiment is somewhat changed from the embodiment of FIGURE 1 in several respects.

The first difference between the control systems is in the routing of the hydraulic fluid from the drive shaft pump (not shown) to the torque pressure chambers 300 and 302 and to the outer race pressure chamber 286. In the FIGURE 11 embodiment hydraulic pressure fluid from the drive shaft pump is directed into a passage 314 in the driven shaft where it is distributed by parallel passages 316 and 318 to the respective torque pressure chambers 300 and 302. The pressure fluid circulates about the torque balls and their carriers for cooling and lubrication and is then directed out of the torque pressure chambers through respective outlet passages 320 and 322 which dump into a common preload chamber 324. The pressure in the preload chamber 324 is impinged against a preload valve 326 which is resiliently biased by a light compression spring 328 toward a closed position shown in FIGURE 11. The valve is formed so that a relatively low pressure difference of 10 p.s.i., for example, will cause the valve to move to the left to connect the preload chamber 324 with an axial chamber 330 within the intermediate shaft 244. The purpose of the preload valve 326 is to impose an initial pressure within the torque pressure chambers 300 and 302 to insure the existence of sufficient initial drive contact pressure between the races and the drive balls.

The central shaft chamber 330 directs hydraulic pressure fluid through radial passages 332 to a control valve 334 which is essentially the same as the control valves 154 and 190 of the FIGURE 1 and FIGURE 7 embodiments, respectively. The valve 334 includes a central control chamber 336 connected by a first control port 338 to the pressure from the passage 332 and by a second control port 340 with the balance chamber 290. The cup member 288 is splined about the peripheral portion of the valve 334 in a loose manner to provide a relief passage 342 corresponding to the relief passage 175 of the first embodiment. Between the two control ports 338 and 340, the control chamber 336 is connected by means of a passage 344 with the outer race pressure chamber 286.

It will be seen that the control system of the FIGURE 11 embodiment provides a series hydraulic circuit from the pump through the torque pressure chambers 300 and 302 to the outer race pressure chamber 286. This is distinguished from the embodiment of FIGURE 1 in which the pump pressure is distributed in parallel to the torque chambers and to the outer race chamber.

In addition to the flow circuit through the torque pressure chambers 300 and 302 for cooling and lubrication, a portion of the fluid is bled off to the chamber containing the drive balls 282 through respective grooves 346 and 348. The groove 346 directs lubricating oil to a passage between the inner race 278 and an integral hub portion 350 of the inner race 280 and deposits the lubricating oil at the base of the inner raceway of the race 278 so that it will flow along the raceway surface by centrifugal force. The lubrication groove 348 directs lubricating oil to an annular chamber 352 below the inner race hub 350, and this annular chamber is connected by a passage 354 to an annular lubrication baffle 356 secured about the hub 350. The baffle is formed as shown to cause the lubricating oil to be spread in a thin sheet at the base of the raceway of the inner race 280 where it flows on the raceway surface by centrifugal force. Inasmuch as the lubricating grooves 346 and 348 and their associate passages are fed by the torque pressure chambers 300 and 302 in which the pressure varies as the torque resistance on the output shaft, the flow through the lubricating grooves increases with torque thus advantageously increasing the lubricating and cooling of the races and the drive balls as the torque load increases.

Pressure fluid entering the chamber containing the drive balls 282 is vented to the casing through vent ports 358 formed through the axial extension of the outer race 276.

From the foregoing description, it will be understood that the present invention provides an improved infinitely variable ball and race type transmission incorporating, in addition to other features, improved means for maintaining minimum required contact pressures varying with the torque transmitted. The transmission is so constructed as to eliminate thrust bearings, and the required rigidity of construction is inherently achieved through the race constructions themselves and through the advantageous bearing locations. The improved torque loading devices not only provide the necessary torque responsive contact pressures but also shift the races symmetrically so that there is no axial inertia of any of the drive parts. The transmission is controlled through a simplified and improved hydraulic control system incorporating either manual or automatic control, or both, to control speed ratios.

Variations and modifications may be effected without departing from the scope or the novel concepts of the present invention.

I claim:

1. In a variable speed drive transmission including a drive shaft and a driven shaft, change speed mechanism drivingly interconnecting said shafts comprising a pair of inner races coupled for rotating with one of said shafts and adapted for relative axial shifting, a pair of outer races coupled for rotating with the other of said shafts and adapted for relative axial shifting, said inner and outer races having respective raceway surfaces defining an annular groove therebetween, a plurality of transmission balls disposed in said groove for rolling movement in contact with said surfaces of said pairs of races, reaction means operatively associated with said transmission balls, first fluid pressure means for urging said outer races toward one another to urge said transmission balls radially inwardly, and second fluid pressure means for urging said inner races toward one another to urge said transmission balls radially outwardly.

2. A variable speed drive transmission according to claim 1 including control means providing fluid pressure varying directly as the torque on said driven shaft to one of said pressure means.

3. A variable speed drive transmission according to claim 1 including control means providing fluid pressure varying directly as the torque on said driven shaft to both of said pressure means whereby the contact pressure between the races and the transmission balls varies with driven shaft torque.

4. A variable speed drive transmission according to claim 1 including mechanism synchronizing movement of one of said pairs of races for axial movement of equal increments in opposite axial directions to retain the centers of said transmission balls in a fixed plane.

5. In a variable speed drive transmission including a drive shaft and a driven shaft, change speed mechanism drivingly interconnecting said shafts comprising a pair of inner races coupled for rotating with one of said shafts and adapted for relative axial shifting, a pair of outer races coupled for rotating with the other of said shafts and adapted for relative axial shifting, said inner and outer races having respective raceway surfaces defining an annular groove therebetween, a plurality of transmission balls disposed in said groove for rolling movement in contact with said surfaces of said pairs of races, reaction means operatively associated with said transmission balls, first fluid pressure means for urging said outer races toward one another to urge said transmission balls radially inwardly, second fluid pressure means for urging said inner races toward one another to urge said transmission balls radially outwardly, and mechanical means varying the contact pressures between said transmission balls and said races directly as the torque on said driven shaft.

6. In a variable speed drive transmission including a drive shaft and a driven shaft, change speed mechanism drivingly interconnecting said shafts comprising a pair of inner races coupled for rotating with one of said shafts and adapted for relative axial shifting, a pair of outer races coupled for rotating with the other of said shafts and adapted for relative axial shifting, said inner and outer races having respective raceway surfaces defining an annular groove therebetween, a plurality of transmission balls disposed in said groove for rolling movement in contact with said surfaces of said pairs of races, reaction means operatively associated with said transmission balls, said raceway surfaces of said inner and outer races being flatter than the surfaces of said transmission balls, means for shifting the races of one of said pairs toward one another to shift said transmission balls radially and to thereby change the speed ratio between said shafts, and fluid pressure means associated with the other of said pairs of races for urging said races toward one another with a force varying as the torque on said driven shaft.

7. A variable speed drive transmission according to claim 6 including spring means associated with the races of said one pair resiliently biasing said races away from one another in opposition to the force imposed by said means for shifting the races toward one another.

8. In a variable speed drive transmission including a drive shaft and a driven shaft, change speed mechanism drivingly interconnecting said shafts comprising a pair of inner races coupled for rotating with one of said shafts and adapted for relative axial shifting, a pair of outer races coupled for rotating with the other of said shafts and adapted for relative axial shifting, said inner and outer races having respective raceway surfaces defining an annular groove therebetween, a plurality of transmission balls disposed in said groove for rolling movement in contact with said surfaces of said pairs of races, reaction means operatively associated with said transmission balls, said raceway surfaces of said inner and outer races being flatter than the surfaces of said transmission balls, means for shifting the races of one of said pairs toward one another to shift said transmission balls radially and to thereby change the speed ratio between said shafts, fluid pressure means associated with the other of said pairs of races for urging said races toward one another with a force varying as the torque on said driven shaft, and mechanical means operatively associated with said driven shaft and said other pair of races and acting in conjunction with said fluid pressure means for urging said other races toward one another with a force varying as the torque on said driven shaft.

9. In a variable speed drive transmission including a drive shaft and a driven shaft, change speed mechanism drivingly interconnecting said shafts comprising a pair of outer races coupled for rotating with one of said shafts and for shifting axially relative to one another, a pair of inner races coupled for rotating with the other of said shafts and for shifting axially relative to one another, a plurality of transmission balls disposed between said pairs of races for rolling movement in contact with the surfaces of said races, reaction means operatively associated with said transmission balls, means operatively associated with one of said pairs of races for shifting said races axially relative to one another, and fluid actuated means operatively associated with the other of said pairs of races, said fluid actuated means including a pair of fluid pressure chambers disposed axially outwardly of said other races for shifting said races axially toward one another with equal and opposite force varying as the pressure of the fluid supplied to said chambers.

10. A variable speed drive transmission according to claim 9 including mechanical synchronizing mechanism operatively associated with one of said pairs of races and coupling said races for positively synchronized movement of equal increments in opposite axial directions.

11. In a variable speed drive transmission including a drive shaft and a driven shaft, change speed mechanism drivingly interconnecting said shafts comprising a pair of outer races coupled for rotating with one of said shafts and for shifting axially relative to one another, a pair of inner races coupled for rotating with the other of said shafts and for shifting axially relative to one another, a plurality of transmission balls disposed between said pairs of races for rolling movement in contact with the surfaces of said races, reaction means operatively associated with said transmission balls, means operatively associated with one of said pairs of races for shifting said races axially relative to one another, fluid actuated means operatively associated with the other of said pairs of races, said fluid actuated means including a pair of fluid pressure chambers disposed axially outwardly of said other races, and fluid pressure means supplying fluid to said chambers varying in pressure as the torque on said driven shaft for shifting said other races axially toward one another in response to increases in torque on said driven shaft.

12. A variable speed drive transmission according to claim 11 including mechanism synchronizing movement of one of said pairs of races for axial movement of equal increments in opposite axial directions.

13. In a variable speed drive transmission, a housing, a pair of coaxial relatively rotatable shafts in said housing, a hollow outer-race-carrying structure having a central portion concentrically disposed about said shafts and opposite end walls extending radially inwardly from said central portion, means connecting one of said end walls with one of said shafts for rotation therewith, a pair of outer races carried by said outer-race-carrying structure for shifting axially relative to one another, a pair of inner races coupled for rotating with the other of said shafts and for shifting axially relative to one another, a plurality of transmission balls disposed between said pairs of races for rolling movement in contact with the surfaces of said races, reaction means operatively associated with said transmission balls, means operatively associated with one of said pairs of races for shifting said races axially relative to one another, means operatively associated with the other of said pairs of races for holding said races in contact with said transmission balls, first bearing means rotatably holding one of said outer-race-carrying structure end walls and said one shaft in concentric relation in said housing and second bearing means rotatably holding the other of said outer-race-carrying structure end walls in said housing in concentric relation with said other shaft, said bearing means being disposed axially outwardly of said inner races.

14. A variable speed drive transmission according to claim 13 including means maintaining one of said inner races in accurate non-tilting relation on said other shaft, whereby said transmission balls are accurately maintained in given radial positions determined by the relative axial positions of the inner and outer races.

15. In a variable speed drive transmission, a pair of coaxial relatively rotatable shafts, a hollow outer-race-carrying structure having a central portion concentrically disposed about said shafts and opposite end walls extending radially inwardly from said central portion, means connecting one of said end walls with one of said shafts for rotation therewith, a first outer race fixedly secured to said outer-race-carrying structure, a second outer race disposed in said outer-race-carrying structure and axially shiftably disposed with respect to said first outer race, said second outer race having a radially inwardly extendingly wall cooperating with said one end wall to form a fluid pressure chamber for moving said outer races toward one another, a pair of inner races coupled for rotating with the other of said shafts and for shifting axially relative to one another, a plurality of transmission balls disposed between said pairs of races for rolling movement in contact with the surfaces of said races, reaction means operatively associated with said transmission balls, means operatively associated with said pair of inner races for holding said races in contact with said transmission balls, and bearing means rotatably holding the other of said outer-race-carrying structure end walls in concentric relation with said other shaft.

16. A variable speed drive transmission according to claim 15 including means providing a fluid pressure balance chamber adjacent said one end wall of said outer-race-carrying structure for counteracting centifugally induced pressure in said fluid pressure chamber.

17. A variable speed drive transmission according to claim 15 including means providing a fluid pressure balance chamber adjacent said one end wall of said outer-race-carrying structure for counteracting centrifugally induced pressure in said fluid pressure chamber, and spring means resiliently biasing said outer races away from one another.

18. In a variable speed drive transmission including a drive shaft and a driven shaft; change speed mechanism drivingly interconnecting said shafts comprising a pair of outer races coupled for rotating with one of said shafts and for shifting axially relative to one another; a pair of inner races coupled for rotating with the other of said shafts and for shifting axially relative to one another; a plurality of transmission balls disposed between said pairs of races for rolling movement in contact with the surfaces of said races; reaction means operatively associated with said transmission balls; means operatively associated with one of said pairs of races for holding said races in contact with said transmission balls; fluid pressure means for urging the other of said pairs of races toward one another to shift said transmission balls radially to change the speed ratio between said shafts; and control means for controlling the pressure in said fluid pressure mean including an adjustable valve, means responsive to the speed of rotation of said driven shaft for biasing said adjustable valve to change the pressure in said fluid pressure means for increasing the speed ratio between said shafts with increase in driven shaft speed, and means responsive to torque on said driven shaft for biasing said adjustable valve to change the pressure in said fluid pressure means for decreasing the speed ratio between said shafts with increase in torque on said driven shaft.

19. In a variable speed drive transmission in combination, a driving shaft, a driven shaft coaxial with said driving shaft, a pair of inner races, a pair of outer races, the races of each of said pair being axially displaceable with respect to each other, one pair of said races being operatively coupled to the driving shaft, the other pair being operatively coupled to the driven shaft, said inner and outer races forming an annular variable groove, a plurality of balls in fixed circumferential spaced relationship radially displaceably supported in said groove for free rolling movement in contact with said pair of races, at least one hydraulic cylinder associated with at least one of said outer races to form a hydraulic chamber, at least one other hydraulic cylinder associated with at least one of said inner races to form another hydraulic chamber, a source of hydraulic fluid under pressure, liquid transmitting conduit for connecting said source with said hydraulic chambers, adjustable valve means associated with said conduit, said valve means being responsive to the output torque and means actuating said valve means to adjust the fluid pressure supplied to said chambers for establishing a new speed ratio.

20. In a variable speed transmission, a pair of coaxial relatively rotatable shafts, a pair of inner races diverging radially outward and constrained for rotation with one of said shafts, a pair of outer races diverging radially inward in opposed concentric relation with the inner races and constrained for rotation with the other shaft, a plurality of balls gripped between said races to roll thereon and being displaceable radially thereof, the races of each pair being relatively axially movable to maintain their gripping relation with the balls and displace them radially attendant to the gripping force of either pair being increased relatively to that of the other pair, means constraining the balls against movement circumferentially of the races to cooperate with the balls for transmitting driving force between the inner and outer races while spinning the balls about respective axes passing through the center thereof lengthwise of said shafts, the inner and outer races being of transverse contour causing them to vary the distance of their gripping points on the balls with reference to such respective axes when the balls are displaced radially to correspondingly vary the relative rotative speed of the inner and outer races, a first hydraulic means hydraulically energized to press the inner races against the balls with a gripping force constituting a function of hydraulic pressure to which such first means is subjected, a second hydraulic means hydraulically energized to press the outer races against the balls with a gripping force constituting a function of the hydraulic pressure to which such second means is subjected, a source of hydraulic fluid under pressure, and means manipulatable to subject such first and second hydraulic means to selective relative pressures of such fluid to alter the radial positions of the balls.

21. In a variable speed transmission, a pair of coaxial relatively rotatable shafts, a hollow outer-race-carrying structure having a central portion concentrically about said shafts and opposite end walls extending radially inwardly from such central portion, means connecting one of said end walls with one of said shafts for rotation therewith, bearing means holding the shafts and the carrying structure in coaxial relation while facilitating rotation of the one shaft and said structure relatively to the other shaft, said central portion of the structure having a cylindrical inner periphery coaxial with such structure, a pair of outer races carried rotatively with said central portion of said structure and diverging radially inward, one of said races being adjacent the one end wall and being in sliding sealing relation with said cylindrical periphery, said one race having a radially inwardly extending wall with a hub portion piloted for endwise movement on one of said shafts, the other race being fixed to the structure adjacent its other end wall, a pair of inner races carried rotatively with said other shaft and diverging radially outward in opposed concentric relation with the outer races, a plurality of balls gripped between the inner and outer races to roll thereon and being displaceable radially thereof, the races of each pair being relatively axially movable to maintain their gripping relation with the balls and displace them radially attendant to the gripping force of either pair being increased relatively to that of the other pair, means constraining the balls against movement circumferentially of the races to cooperate with the balls for transmitting driving force between the inner and outer races while spinning the balls about respective axes passing through the center thereof lengthwise of the shafts, means reacting between the outer-race-carrying structure and the one outer race to urge the outer races axially toward each other and against the balls, torque-loading means mounted upon said other shaft and reacting between such other shaft and the inner races to urge the inner races axially toward each other and against the balls with a force constituting a direct function of torsional force transmitted between such other shaft and the inner races, the one outer race and the inner races being tiltable relatively to the other outer race to place their axes angularly relatively to the axis of such other race attendant to causing the races to engage each of the balls despite departure of the balls and races in uniformity and exactness in dimensions, and the torque-loading means being adjustable relatively to said other shaft on which they are mounted to adapt them to exert force on the inner races substantially uniformly axially thereof while such races are tilted as aforesaid.

22. In a variable speed drive transmission including a drive shaft and a driven shaft, change speed mechanism drivingly interconnecting said shafts comprising a pair of outer races coupled for rotating with one of said shafts and for shifting axially relative to one another, a pair of inner races coupled for rotating with the other of said shafts and for shifting axially relative to one another, a plurality of transmission balls disposed between said pairs of races for rolling movement in contact with the surfaces of said races, reaction means operatively associated with said transmission balls, means operatively associated with one of said pairs of races for shifting said races axially relative to one another, and torque means operatively associated with the other of said pairs of races for shifting said races axially toward one another in response to increases in torque on said driven shaft, said torque means including a pair of torque reaction members disposed on said other shaft, and means for universally tiltably securing said members on said other shaft whereby said races engage each of said transmission balls despite variations of the balls and races in uniformity and exactness of dimensions.

References Cited by the Examiner
UNITED STATES PATENTS

| | | | |
|---|---|---|---|
| 1,526,493 | 2/1925 | Dolton | 74—198 X |
| 2,701,970 | 2/1955 | Kraus | 74—200 |
| 2,727,396 | 12/1955 | Haugwitz | 74—198 |
| 2,874,592 | 2/1959 | Oehrli | 74—796 |

FOREIGN PATENTS

| | | |
|---|---|---|
| 343,813 | 10/1936 | Italy. |
| 198,086 | 11/1957 | Austria. |

DON A. WAITE, *Primary Examiner.*

BROUGHTON G. DURHAM, *Examiner.*